Patented Apr. 2, 1935

1,996,073

UNITED STATES PATENT OFFICE

1,996,073

PROCESS FOR THE PRODUCTION OF SHAPED OBJECTS FROM AQUEOUS DISPERSIONS OF ORGANIC SUBSTANCES

Paul Klein and Francis Gábor, Budapest, Hungary, assignors to American Anode Inc., Akron, Ohio No Drawing. Application May 26, 1928, Serial No. 280,951. In Germany June 24, 1927

16 Claims. (Cl. 18—58)

This invention relates to a process for the production of shaped objects from aqueous dispersions of organic substances.

It has already been proposed to produce shaped objects from aqueous dispersions of organic substances by the coagulation of the dispersed substances upon a mould dipped into the dispersion, without the aid of electrolytic or electrophoretic actions, by making the mould porous and impregnating it with a solution adapted to effect coagulation so that on dipping the thus activated mould into the dispersion, the solution present in the pores of the mould effects the coagulation of the dispersed substances upon the surface of the mould. The circumstance that the coagulating solution filling the pores must be renewed very frequently detracts from the economy of this mode of operation.

The present invention consists in making deposits of organic substances by dipping moulds or forms composed wholly or in part of solid or solidified coagulants or agglomerants into dispersions of the said organic substances. The material constituting the forms dissolves in the liquid dispersion medium and diffuses out through the dispersion, coagulating a layer of the dispersed substance in contact with the surface of the form. Thus in contradistinction to the above-described known processes, in which the dipping form itself merely determines the shape of the coagulum and the coagulation is effected by the solution present in the pores of the mould, according to the present process the dipping form serves both to produce the coagulated deposit and to determine its shape.

Certain embodiments of the process of the present invention will hereinafter be described by way of example.

If the dipping mould or form is formed from a water-soluble dense solid salt, for example from crystalline alum or gypsum or the like, and if it is for example dipped into a weakly alkaline dispersion, such as caoutchouc latex preserved with ammonia, then at the moment of dipping, a solution containing coagulating metal ions is formed on the surface of the form, effecting an immediate coagulation so that the immersed portion of the form is practically instantaneously covered with a skin of coagulum and is thereby protected against excessive dissolution. Since however the skin of coagulum is permeable, it permits the metal ions to pass therethrough, so that the thickness of the coagulated layer increases continuously during the dipping period.

In another embodiment of the process the form may consist of a metal which is attacked by the dispersion, so that in this case the ions passing from the metal surface into the solution, effect the coagulation. If for example forms of zinc are immersed in a dispersion containing a solution of ammonium sulphide, zinc ions will continuously pass into the solution effecting the coagulation of the dispersed substance. No detrimental development of gas takes place since ammonia and zinc sulphide are produced as final products during the reaction between the zinc and the dispersion.

When zinc or aluminium are employed as the material for the form, a development of hydrogen would be expected during the reaction between the metal and the dispersion. However, the development of gas, which would render the coagulated deposit porous or spongy, may be prevented by causing a chemical combination of the gas as fast as it forms, or by removing the gas by mechanical means. The details of this embodiment will be explained subsequently.

In a further embodiment of the process, the form may consist of an organic or an inorganic acid which is soluble in the dispersion, for example of crystallized citric acid. The behaviour of such a form is substantially similar to that of dipping forms consisting of soluble salts, described at the outset of the specification.

Liquid coagulants may also be employed if their viscosity can be increased to such an extent that they do not flow during the dipping porcess. The viscosity may even be increased to the point of gelation by incorporating a suitable colloid in the coagulant. For example, acetic acid may be mixed with collodion in such proportions as to give a solid gel which may be given any desired shape. Similarly a coagulating salt such as calcium chloride may be mixed with a hydrophyllic colloid which forms liquid solutions when hot but gels when cooled. Further modifications of this embodiment of the invention will be obvious to those skilled in the art. The forms made in the manner indicated above have the advantage that they may be readily and cheaply produced in large numbers and that the coagulation of the dsipersions on the surfaces thereof is uniform and rapid.

In the above described embodiments it has been assumed that the entire dipping form consists of the coagulating mass. In most cases however, it is more advantageous to make the form of a carrier which does not take part in the coagulation, and to apply to said carrier the active coagulant hereinabove described. In certain cases an inert solid core of metal, stoneware, wood or the like, may be coated with a comparatively thin layer of the active mass. For example a layer of the water soluble salt or an acid collodion skin or an active metal skin consisting of zinc or aluminium may be thus employed.

The carrier may also be of a different shape. For example it may form a skeleton, the interstices of which are filled up with the active mass. A carrier of this type is especially advantageous in cases where the active mass per se is not very solid.

The employment of a carrier which supports the active mass proper, also enables paste-like active masses to be employed. Such paste-like active masses come into consideration in cases where for example a metal effects the coagulation and the development of gas is to be retarded. For this purpose a paste adapted to be spread can be formed from the finely subdivided metal. For example aluminium bronze may be mixed with solid oxidizing agents such as manganese dioxide or lead peroxide, adapted to combine immediately with the hydrogen liberated during the reaction, if desired in conjunction with a binding agent, and this paste may be applied to the carrier. When such a paste is employed as the coagulating mass, the metal dust effects the coagulation proper whilst the oxidizing agent immediately oxidizes the hydrogen produced during the reaction, so that gas bubbles cannot be produced. However in this connection it should be mentioned that when metals, such as zinc or aluminium, are employed as agglomerating agents, the production of hydrogen may also be prevented by adding to the dispersion substances, preferably dissolved, which do not permit development of hydrogen by virtue of their capability of being easily reduced.

In carrying out the present process moulds may also be employed the side of which remote from the dispersion consists of a substance effecting the coagulation whilst the side facing the dispersion consists of a substance adapted to prevent undesired substances from entering the dispersion or the coagulum derived therefrom. For example in an alkaline dispersion, an aluminium form may be employed the side of which facing the dispersion, is coated with a thin gelatine skin, which whilst permitting the dispersion liquid to pass to the aluminium surface, nevertheless prevents the gas bubbles developed on the metal surface, from penetrating into the coagulum. Obviously such semi-permeable separating layers separating the active surface of the depositing form from the coagulum, may be employed not only with metallic but also with any other of the previously described forms.

The metallic forms employed may be formed from metal fabric and any hydrogen which may be produced during the reaction may be drawn off by reducing the pressure, at the side of the dipping body remote from the dispersion.

In most of the modifications of the invention hereinabove described, an increase of temperature has an accelerating action. In many cases the reaction effecting the coagulation only takes place at an elevated temperature. In order to obtain the desired temperature, either the dispersion or the form or both may be employed in a warm state or may be heated during the coagulation.

The process is suitable for the treatment both of vulcanized or unvulcanized, natural or concentrated or artificial emulsions of caoutchouc, gutta-percha, balata, factis, reclaim, or like products, to which, if desired, additional substances, vulcanizing agents, accelerators, dyes and filling materials and the like may have been added and to dispersions of other organic substances such as casein, albumen, cellulose esters and ethers, artificial and natural resins and the like. Such emulsions may carry a positive or negative charge or may be uncharged.

Having now particularly described and ascertained the nature of our said invention and in what manner the same is to be performed, we declare that what we claim is:—

1. The method of producing shaped articles from an aqueous dispersion of an organic substance which comprises immersing in the said dispersion a form consisting at least in part of a massive rigid, water-soluble coagulant for the dispersion.

2. The method of producing shaped articles from an aqueous dispersion of an organic substance which comprises immersing in the said dispersion a form with a surface consisting of a massive, solid, water-soluble coagulant for the dispersion.

3. The method of producing shaped articles from an aqueous dispersion of an organic substance which comprises imparting the desired shape to a massive coagulant composition for the dispersion, and associating the shaped coagulant with the dispersion until the coagulum has attained the desired size.

4. The method of producing shaped articles from an aqueous dispersion of an organic substance which comprises providing a supporting structure with a massive, shaped surface consisting of a solid substance capable of dissolving in water without chemical change to give rise to a coagulant for the dispersion, and associating the coagulant structure with the dispersion until the coagulum has attained the desired size.

5. The method of producing shaped rubber articles which comprises associating with an aqueous rubber dispersion a form consisting at least in part of a massive crystalline, water-soluble coagulant for the dispersion.

6. The method of producing shaped rubber articles which comprises dipping a form whose surface consists of a massive coagulating substance into an aqueous dispersion of rubber in which the said coagulating substance is soluble.

7. The method of producing shaped rubber articles which comprises dipping a form into an aqueous dispersion of rubber, the said form consisting of a massive substance adapted to dissolve in the said aqueous dispersion without chemical change and with the liberation of coagulating ions.

8. The method of producing shaped rubber articles which comprises providing a supporting structure with a massive, shaped surface of a substance adapted to dissolve in an aqueous medium with the liberation of coagulating ions, and immersing the said structure in an aqueous dispersion of rubber.

9. The method of producing shaped rubber articles which comprises immersing in an aqueous dispersion of rubber a form consisting at least in part of a soluble, solid crystalline coagulant salt.

10. The method of producing shaped rubber articles which comprises providing a supporting structure with a massive, shaped surface of a soluble crystalline coagulant salt, and immersing the said structure in an aqueous dispersion of rubber.

11. The method of producing vulcanizable shaped rubber articles which comprises adding vulcanizing agents to an aqueous dispersion of rubber, providing a supporting structure with a massive, shaped layer of a soluble coagulant, and immersing the said form in the said dispersion.

12. The method of producing shaped rubber articles which comprises imparting the desired shape to a coagulant, coating the shaped coagulant with a semi-permeable gel, and immersing the coated coagulant in an aqueous rubber dispersion.

13. The method of producing shaped rubber articles which comprises imparting the desired shape to a massive, solid coagulant, immersing the shaped coagulant in an aqueous dispersion of rubber, and raising the temperature of the dispersion adjacent the coagulant to accelerate the coagulation thereof.

14. The method of producing shaped rubber articles which comprises providing a form embodying a coagulant capable of diffusing therefrom, coating the form with a semi-permeable gel, and immersing the coated coagulant in an aqueous rubber dispersion.

15. The method of producing shaped rubber articles which comprises providing a supporting structure with a coagulant surface having the shape of the desired article, coating the coagulant surface with a semi-permeable gel, and immersing the coated coagulant in an aqueous rubber dispersion.

16. The method of producing shaped rubber articles which comprises providing a supporting structure with a massive, shaped surface of a substance adapted to dissolve in an impervious medium with the liberation of coagulant ions, coating the coagulant surface with a semi-permeable gel, and immersing the coated coagulant in an aqueous rubber dispersion.

PAUL KLEIN.
FRANCIS GÁBOR.